United States Patent
Quinn et al.

(10) Patent No.: US 6,955,832 B2
(45) Date of Patent: Oct. 18, 2005

(54) COLORED PRINTING INK FOR CONTACT LENSES

(75) Inventors: Michael Hugh Quinn, Valparaiso, IN (US); Robert Carey Tucker, Arlington Heights, IL (US); Sandra Corti, Mt. Prospect, IL (US); John Christopher Phelan, Gurnee, IL (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 10/098,870

(22) Filed: Mar. 15, 2002

(65) Prior Publication Data

US 2003/0054109 A1 Mar. 20, 2003

Related U.S. Application Data

(60) Provisional application No. 60/342,199, filed on Dec. 19, 2001, and provisional application No. 60/276,772, filed on Mar. 16, 2001.

(51) Int. Cl.$^7$ ................................................. B05D 3/00
(52) U.S. Cl. ................. 427/2.31; 427/2.1; 427/2.24; 427/162; 427/164; 427/256; 427/372.2
(58) Field of Search ................... 427/2.1, 2.24, 427/2.31, 162, 164, 256, 372.2

(56) References Cited

U.S. PATENT DOCUMENTS

| | | | |
|---|---|---|---|
| 4,336,309 A | 6/1982 | Jackel et al. | 428/447 |
| 4,499,150 A | 2/1985 | Dowbenko et al. | 428/447 |
| 4,638,040 A | 1/1987 | Hammar | 526/245 |
| 4,746,691 A | 5/1988 | Fuhrman | 524/40 |
| 4,857,072 A | 8/1989 | Narducy et al. | 8/507 |
| 4,914,143 A | 4/1990 | Patel | 522/148 |
| 5,039,459 A | 8/1991 | Kindt-Larsen et al. | 264/2.6 |
| 5,091,468 A | 2/1992 | Takeuchi | 524/761 |
| 5,713,963 A | 2/1998 | Bensky | 8/507 |
| 5,936,703 A | 8/1999 | Miyazaki et al. | 351/160 R |
| 6,027,745 A | 2/2000 | Nakada et al. | 424/427 |
| 6,187,863 B1 | 2/2001 | Wilt et al. | 525/100 |
| 6,281,321 B1 | 8/2001 | Kelly et al. | 528/17 |
| 6,315,410 B1 | 11/2001 | Doshi | 351/162 |

FOREIGN PATENT DOCUMENTS

| | | |
|---|---|---|
| EP | 0 187 137 | 7/1986 |
| EP | 0 382 005 | 8/1990 |
| EP | 0 393 532 | 10/1990 |
| EP | 0 983 837 | 3/2000 |
| WO | WO 01/05578 | 1/2001 |
| WO | WO 01/32789 | 5/2001 |

OTHER PUBLICATIONS

International Search Report.

*Primary Examiner*—Jennifer Michener
(74) *Attorney, Agent, or Firm*—Jian S. Zhou; Robert J. Gorman

(57) ABSTRACT

The present invention provides novels inks and methods for making a colored polymeric substrates, preferably a contact lens. In the inventive method at least a portion of a surface of a lens is coated with a color coat comprising at least one colorant, and a binder polymer obtained by copolymerizing a first monomer being ethylenically unsaturated and having a latent crosslinkable pendent group; and a second monomer having an ethylenically unsaturated double bond copolymerizable with the first monomer. The lens is then subjected to conditions that cause the color coat to adhere to the lens.

27 Claims, No Drawings

COLORED PRINTING INK FOR CONTACT LENSES

STATEMENT OF RELATED APPLICATIONS

This patent application claims priority on provisional application Ser. No. 60/342,199 filed Dec. 19, 2001 and 60/276,772 filed Mar. 16, 2001, the entirety of which are hereby incorporated by reference.

The present invention relates to a method for making a colored printing ink that can be applied to contact lenses or to the molds that will be used to make contact lenses. In the latter case, the ink printed on the mold surface would be incorporated into the contact lens as contact lens constituent monomers are then added to the mold and polymerized. In either case, the resultant product will be a contact lens to which colored ink has been applied.

BACKGROUND OF THE INVENTION

Methods have been disclosed to make printing inks suitable for printing either contact lenses or the molds that are then used to make contact lenses. For example, U.S. Pat. No. 4,668,240 to Loshaek discloses colored contact lenses produced by providing a contact lens constructed of polymer and coating at least a portion of the lens with coloring substance, a binding polymer having functional groups, and an additional compound having at least one of —NCO or epoxy. The lens and binding polymers are bonded to each other by the reaction of functional groups.

U.S. Pat. No. 4,857,072 to Narducy, et al. discloses a method for making colored hydrophilic contact lenses. At least a portion of the surface of the lens is coated with a color coat comprising at least one pigment, binding polymer having functional groups, and an additional compound having at least two groups per molecule of —NCO. The coated lens is then subjected to conditions that cause the color coat to adhere to the lens.

U.S. Pat. No. 5,272,010 to Quinn discloses a method for preparation of colored contact lenses similar to that of U.S. Pat. Nos. 4,668,240 and 4,857,072 except that an isocyanate compound is not required. Instead, adhesion promoters such as hexamethoxymethylmelamine are used.

The above-referenced patents (all of which are incorporated herein by reference) are substantially similar in that they all require (a) one or more pigments to add colorant to the contact lens; (b) one or more monomers to help the printing ink bind to the contact lens; (c) an initiator to polymerize the monomers in the printing ink; (d) a binder polymer with appropriate functional groups; and (e) an adhesion promoter to form crosslinks with the functional groups of the binder polymer. The adhesion promoter can also chemically bond the binder polymer to the lens polymer.

However, the methods known in the art have several disadvantages. The first disadvantage concerns the potential use of a diluent in the monomer mixture that is polymerized to make contact lenses. A diluent in the monomer mixture is a well recognized technique for casting contact lenses (U.S. Pat. No. 5,039,459 Larsen-Kindt, et al.). However, a diluent in the monomer mixture and subsequently in the contact lens may interfere with the required crosslinking of the binder polymer. This may be an effect of diluting the concentration of reagents and/or the diluent may react with adhesion promoter to the detriment of the bonding needed to provide adequate adhesion of the colorant to the contact lens. In any case, the capability of the adhesion promoter to provide adequate adhesion of the colorant to the contact lens is diminished.

The second disadvantage of the current processes is related to the requirement that a separate adhesion promoter in the form of a reagent or a specialty, reactive coating be added to the colored lens printing ink. This has all the disadvantages associated with adding an additional ingredient to a manufacturing process.

The third disadvantage is observed in the need for a separate step to react the adhesion promoter to functional groups of the binder polymer. The most commonly described separate step is a thermal cure and this necessitates adding costly equipment to the lens manufacturing process.

The fourth disadvantage is that the printing inks currently used contain a polymerization initiator and monomers that must be polymerized in a post-printing operation.

SUMMARY OF THE INVENTION

The present invention comprises a method for making a colored polymer substrate, preferably a medical device, most preferably a hydrophilic contact lens, comprising the steps of:

(a) providing a contact lens constructed of a polymer (b) coating at least a portion of a surface of the lens with a color coat comprising at least one colorant, and a binder polymer obtained by copolymerizing polymerizable components comprising
   a. an ethylenically unsaturated monomer having a latent crosslinkable pendent group (hereinafter referred to as a compound (A)); and
   b. a monomer (B) which has ethylenically unsaturated double bond copolymerizable with the compound (A) (hereinafter referred to as a monomer (B); and (c) subjecting the coated lens to conditions which cause the color coat to adhere to the lens;

wherein monomer (B) is substantially non-reactive with the latent crosslinkable group of monomer (A).

A second aspect of the invention comprises a method for making a colored polymer substrate, preferably a medical device, most preferably a hydrophilic contact lens, comprising the steps of:

(a) coating at least a portion of at least one lens-forming surface of a lens mold with a color coat comprising at least one colorant, and a binder polymer obtained by copolymerizing polymerizable components comprising
   a. a monomer (A) as disclosed above; and
   b. a monomer (B) as disclosed above;

(b) adding a lens forming composition to the lens mold while maintaining the color coat in position;

(c) curing the lens-forming composition to form a coated lens; and (d) subjecting the coated lens to conditions which cause the color coat to adhere to the lens.

wherein monomer (B) is substantially non-reactive with the latent crosslinkable group of monomer (A).

A third aspect of the invention comprises a printing ink as disclosed above and a method for use thereof that is substantially free of a separate adhesion promoter species such as hexamethoxymethylmelamine or hexamethylene diisocyanate. Known adhesion promoter species in printing contact lenses are described in U.S. Pat. Nos. 4,668,240; 4,857,072; and 5,272,010, incorporated herein by reference. Specifically, the inks of the present invention are preferably free of isocyanate compounds.

A fourth aspect of the invention comprises a method of forming a contact lens containing an image thereon comprising the step of inkjet printing a moisture curable ink composition of the invention onto a hydrogel contact lens.

A fifth aspect of the invention comprises polymeric substrates, preferably hydrophilic colored contact lenses, made by the inventive methods.

DETAILED DESCRIPTION OF THE INVENTION

Definitions

Unless defined otherwise, all technical and scientific terms used herein have the same meaning as commonly understood by one of ordinary skill in the art to which this invention belongs. Generally, the nomenclature used herein and the laboratory procedures well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art. As employed throughout the disclosure, the following terms, unless otherwise indicated, shall be understood to have the following meanings:

"Moisture" includes both water and water vapor including atmospheric water vapor.

"Colorant" includes both dyes and opaque coloring agents, either alone or in combination.

"Dye" means a substance that is soluble in a solvent and is used to impart color. Dyes are typically translucent and absorb, but do not scatter light. Dyes can cover both optical (covering the pupil) and non-optical regions (not covering the pupil) of contact lens. Nearly any dye can be used in the present invention, as long as it is compatible with the processes described herein, including fluorescent dyes, phosphorescent dyes, pearlescent dyes, and conventional dyes.

"Fluorescent dyes" include dyes that produce immediate luminescence when exposed to visible or ultraviolet radiation. Typically, the luminescence is at a wavelength longer than the wavelength causing the fluorescence and ceases immediately when the incident light or ultraviolet radiation is stopped.

"Phosphorescent dyes" include dies that produce delayed luminescence when exposed to visible or ultraviolet radiation. Typically, the luminescence is at a wavelength different than the wavelength causing the phosphorescence and continues for a prolonged time after the incident light or ultraviolet radiation is stopped.

"Opaque coloring agent" includes both pigments and particles.

"Pigment" in the context of opaque coloring agents refers to a variety of organic or inorganic insoluble pigments known in the art, such as titanium dioxide, red iron oxide, yellow iron oxide, Pigment Blue 15 (phthalocyanine blue (CI 74160)), Pigment Green 7 (phthalocyanine green (CI 74260)), Pigment Blue 36 (cobalt blue (CI 77343)), or chromium sesquioxide. Some pigments may exhibit fluorescence or phosphorescence. While specific examples are given throughout this specification, the skilled artisan will recognize that any of a variety of pigments may be used.

"Particle" in the context of opaque coloring agents refers to a variety of colored particles, as they are known in the art, such as India ink. This term also includes structures that while not colored, give the appearance of color by, for example, diffraction or scattering (for example) of light by the particle. Some particles may exhibit fluorescence or phosphorescence.

"Ethylenically unsaturated" is employed herein in a broad sense and is intended to encompass, for example, vinyl compounds, acrylic compounds, and methacrylic compounds. The basic criteria with respect to the ethylenically unsaturated monomers are that they contain at least one >C=C<group, that is copolymerizable without gelation with the opposite monomer and does not otherwise preclude the utilization of the finished pigment binder.

"Lens" as used herein refers to a composition of matter that can transmit light. A lens preferably can act as an optical lens, such as a contact lens. In certain aspects of the present invention, a lens need not act as an optical lens, such as a contact lens that is used for vanity purposes as opposed to purposes relating to the correction, improvement, or alteration of a user's eyesight.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A contact lens can be in a dry state or a wet state.

"Dry State" refers to a soft lens in a state prior to hydration or the state of a hard lens under storage or use conditions.

"Wet State" refers to a soft lens in a hydrated state.

"Hydrogel" refers to a polymer that swells in an aqueous solution due to the absorbance of water. A hydrogel includes water or an aqueous solution as part of its structure.

"Polymer" refers to a linkage of monomers. Preferably, a polymer is a polymer appropriate for use in lenses, such as contact lenses. A polymer can be, for example, a homopolymer, a heteropolyrner, a copolymer, a hydrophobic polymer, a hydrophilic polymer, or any combination thereof.

"Ophthalmically compatible," as used herein, refers to a material or surface of a material which may be in intimate contact with the ocular environment for an extended period of time without significantly damaging the ocular environment and without significant user discomfort. Thus, an ophthalmically compatible contact lens will not produce significant corneal swelling, will adequately move on the eye with blinking to promote adequate tear exchange, will not have substantial amounts of lipid adsorption, and will not cause substantial wearer discomfort during the prescribed period of wear. The lenses of the present invention are preferably ophthalmically compatible.

"Ocular environment," as used herein, refers to ocular fluids (e. g., tear fluid) and ocular tissue (e.g., the cornea) which may come into intimate contact with a contact lens used for vision correction, drug delivery, wound healing, eye color modification, or other ophthalmic applications.

"Hydrophilic," as used herein, describes a material or portion thereof that will more readily associate with water than with lipids.

The "front surface" of a lens, as used herein, refers to the surface of the lens that faces away from the eye during wear. The front surface, which is typically substantially convex, may also be referred to as the front curve of the lens.

The "rear surface" of a lens, as used herein, refers to the surface of the lens that faces towards the eye during wear. The rear surface, which is typically substantially concave, may also be referred to as the base curve of the lens.

"Thickener" refers to compounds that is used to increase the viscosity of a liquid or partially liquid mixture or solution such as that term is known in the art, An example of a thickener is a polyvinyl alcohol.

"Printing" refers to the application of at least one color coat to a surface or structure to form an image. Printing can use any appropriate device or method known in the art of later developed for a particular purpose.

"Pattern" refers to a predetermined image to be printed onto the contact lenses. The pattern may either be fanciful or realistic in appearance. The pattern is preferably designed in accordance with U.S. Pat. Nos. 5,160,463 to Evans et al. and 5,414,477 to Jahnke).

"Nucleophilic" is used in accordance with its well-known meaning and refers to a compound, composition, or reagent that forms a bond to its reaction partner by donating both bonding electrons to that reaction partner.

The present invention provides methods for making a colored hydrophilic contact lens. In a first embodiment of the invention the method comprising the steps of coating at least a portion of a surface of a lens with a color coat comprising at least one colorant, preferably a pigment, and a binder polymer. The binder polymer is obtained by copolymerizing polymerizable components comprising an ethylenically unsaturated monomer having a latent crosslinkable pendent group; and a monomer (B) which has ethylenically unsaturated double bond copolymerizable with the compound (A). The lens is then subjected to conditions that cause the color coat to adhere to the lens. Specifically, the binder polymer cross-links, thus entrapping the colorant and adhering to the lens.

Alternatively, in a preferred embodiment, the color coat can be applied to a lens-forming surface of a mold for making contact lenses. A polymerizable or cross-linkable composition is then added to the mold and cured to form a color contact lens onto which the color coat is transferred from the mold to become an integral part of the contact lens. In this method, the colored contact lens has a smooth surface that may provide more comfort to the wearer. Suitable methods for printing upon a lens mold are disclosed in U.S. Pat. No. 5,034,166 to Rawlings, et al., incorporated herein by reference.

The color coat that is applied to the lens comprises at least one colorant, preferably a pigment, and a binder polymer. The binder polymer is obtained by copolymerizing polymerizable components comprising (A) an ethylenically unsaturated monomer having a latent crosslinkable pendent group (hereinafter referred to as a compound (A)) and a monomer (B) which has ethylenically unsaturated double bond copolymerizable with the compound (A) (hereinafter referred to as a monomer (B).

The latent crosslinkable pendent group comprises a labile functional group capable of reacting after (A) and (B) are copolymerized to crosslink the resulting polymer. Possible functional groups include epoxy, hydroxy, alkenyl, isocyanate, peroxy, perester, anhydride, silane, and combinations thereof.

The latent crosslinking reaction may be activated by moisture, nucleophilic catalysis, heat, or combinations thereof. To allow for moisture-activated crosslinking, incorporating one or more of the following into the compound (A) is desirable: alkoxysilane, silanol, acetoxysilane, silanes, or halosilane groups. Alkoxysilane, acetoxysilane, silanes, or halosilane form silanols upon exposure to moisture. The silanols react with each other to form siloxane bonds. Therefore, polymer chains containing pendant silanol groups (or precursors) can combine to form crosslinks through the formation of siloxane linkages. Being moisture activated, the crosslinks would form during hydration of the polymer. The preferred latent crosslinkable pendant groups are halosilane and alkoxysilane, with alkoxysilane being the most preferred.

Crosslinking reactions involving organosilicon functional groups could also occur by non-hydrolytic processes. Halosilanes can form siloxane bonds by being exposed to alkoxy silane, metal oxides (e.g., calcium oxide, magnesium oxide, zinc oxide, copper oxide, etc.) and alcohol+ carboxylic acid.

Alkoxysilanes can combine with each other to form siloxane bonds. Crosslinking and curing of silicones is well known (see W. Noll, Chemistry and Technology of Silicones, Academic Press, Inc., London).

In addition, alkoxysilanes also form siloxane bonds when exposed to silanols, acetoxysilanes, carboxylic acids, and acids such as HCl. Hydrolytic and non-hydrolytic reactions in which siloxane bonds are formed could be used to introduce crosslinks into the color coating once it is applied to the lens. When water is applied to the lens during the hydration step, crosslinking reactions are initiated, thereby causing the color coat to adhere to the lens.

The preferred compound (A) is a polymerizable halosilane or alkoxysilane compound of the formula (I):

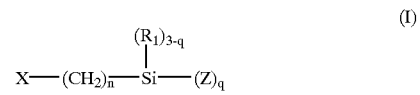

(I)

wherein X is a polymerizable group containing an unsaturated double bond; n is an integer from 0 to 12; Z is either a halide or —OR$_2$; each R$_1$ is, independently of any other, a halide, or a substituted or unsubstituted C$_{1-6}$ alkyl group; R$_2$ is, independently of any other, a substituted or unsubstituted C$_{1-6}$ alkyl group and q is an integer from 1 to 3.

In the above formula, X is preferably a (meth)acryloxy group, vinyl group, an allyl group, or a group of the formula

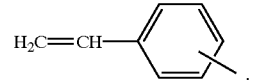

.

More preferably, X is a (meth)acryloxy group or a vinyl group; and most preferably a methacryloxy group.

The integer n is preferably from 1 to 12; more preferably from 1 to 6; and more preferably from 2 to 4. The most preferred value for n is 2 or 3, especially when X is a methacryloxy group. One of ordinary skill in the art will recognize appropriate n can be determined, through the teachings of this description, by routine experimentation.

Typical examples of the polymerizable alkoxysilane compound (Z is —OR$_2$ in the above formula) include, but are not limited to: methacryloxyethyltrimethoxysilane, methacryloxyethylmethyldimethoxysilane, methacryloxyethyldimethylmethoxysilane, methacryloxyethyltriethoxysilane, methacryloxyethylmethyldiethoxysilane, methacryloxyethyldimethylethoxysilane, methacryloxypropyltrimethoxysilane, methacryloxypropylmethyldimethoxysilane, methacryloxypropyidimethylmethoxysilane, methacryloxypropyltriethoxysilane, methacryloxypropylmethyldiethoxysilane, methacryloxypropyidimethylethoxysilane, styrylethyltrimethoxysilane, and 3-(N-styrlmethyl-2-aminoethylamino) propyltrimethoxysilane hydrochloride. These compounds may be used alone or in combination as a mixture of two or more of them.

R$_2$ is preferably an unsubstituted C$_{1-6}$ alkyl; more preferably an unsubstituted C$_{1-4}$ alkyl; more preferably an unsubstituted C$_{1-2}$ alkyl; and most preferably a methyl group. While it is presently preferred that the abovementioned R$_2$ be unsubstituted alkyl, it should be apparent to one of ordinary skill in the art that any of the above-mentioned preferable $R_2$ group could also be substituted as long as such substitution did not interfere with the invention as described herein. Furthermore, it is preferable that each $R_2$ be the same as other $R_2$ (if any) present.

The preferred alkoxysilane compounds are methoxysilanes (Z is —$OR_2$ and $R_2$ is methyl). The preferred methoxysilanes include methacryloxyethyltrimethoxysilane, methacryloxyethylmethyldimethoxysilane, and methacryloxyethyldimethylethoxysilane.

If Z is a halide, the preferred halide is chloride. Likewise, it is preferable that each Z be the same as other Z (if any) present. Preferred examples of the polymerizable halosilane compound of the above formula (I) include, but are not limited to: methacryloxypropylmethyldichlorosilane, methacryloxypropyltrichlorosilane, 3-methacryloxypropyldimethylchlorosilane, and methacryloxyethyltrichlorosilane.

In the above formula, q can be suitably determined taking the reactivity for the condensation reaction into consideration.

The amount of the compound (A) in the polymerizable components, is preferably adjusted to be between 5% and 25%, by weight, of the binder (A+B) in order to sufficiently obtain crosslinking effects.

The monomer (B) that can be used in the present invention, is a monomer which has an unsaturated double bond copolymerizable with the compound (A) and which is substantially non-reactive with the latent crosslinkable group of monomer (A). Specifically, during the polymerization process, monomer (B) undergoes no crosslinking reaction with compound (A). Such a monomer (B) may, for example, be one having one copolymerizable unsaturated double bond, i.e. a monomer other than a crosslinkable monomer or a crosslinkable macro-monomer having at least two polymerizable groups. The compound (B) is preferably silicon-free.

However, it should be noted that compound (A) or the combined binder polymer (A+B) might cross-link in the presence of nucleophilic reagents. Monomers that contain groups having active hydrogen atoms, for example, hydroxy functional groups (e.g. ROH), primary and secondary amine functional groups (e.g., $RNH_2$ or $R_2NH$), or acid functional groups (e.g., RCOOH) are likely to cause gelation/crosslinking during copolymerization with e.g., alkoxysilanes. As a result, the number of suitable monomers (B) for copolymerization with compound (A) is limited to those that will not readily undergo a crosslinking reaction with the compound (A).

However, amounts of monomer (B) containing a number of active hydrogens insufficient to cause premature gelation may be utilized in preparation of the pigment binder. Moreover, if multiple monomers (B) are utilized in the preparation of the pigment binder, at least one of such monomers should be substantially free of active hydrogen atoms and the total weight of those monomers having active hydrogen atoms is less than 10% by weight of the total amount of monomer (B). Preferably, those monomers having active hydrogen atoms are less than 0.5% by weight of the total amount of monomer (B).

Typical examples of the monomer (B) lacking active hydrogen atoms include a N-vinyl heterocyclic monomers, such as N-vinyl-2-pyrrolidone (NVP); $C_1$ to $C_6$ alkyl vinyl ethers, such as vinyl ethyl ether; $C_1$ to $C_6$ alkyl ester of acrylic or methacrylic acid, such as methyl methacrylate and propyl acrylate; $C_1$ to $C_6$ alkyl styrene, such as t-butyl styrene; vinyl monomers, such as vinyl chloride and vinyl acetate; diene monomers, such as isoprene; and $C_1$ to $C_6$ alkoxy $C_1$ to $C_6$ alkyl esters of acrylic or methacrylic acid, such as ethoxyethyl methacrylate (EOEMA) or methoxypropyl acrylate. These monomers may be used alone or in combination as a mixture of two or more of them.

Alternatively, active hydroxyl groups of monomer (B) can be "masked" or protected by a solvolyzable group to prevent reaction with the latent crosslinkable group of monomer (A). By "solvolyzable" it is generally meant an ester linking group capable of cleaving into a carboxyl-containing compound (e.g., amide, ester, or acid) and an alcohol in the presence of a nucleophile such as water or a weak base such as ammonia or an organic amine (at room temperature) or in the presence of a lower ($C_1$ to $C_4$) alkanol (at temperatures up to 60° C.). For instance the active hydrogens of glycerol methacrylate can be masked with a group such as trichloroacetyl or perfluoracyl. The solvolyzable would later hydrolyze in the presence of a nucleophile. Such groups are disclosed in U.S. Pat. No. 4,638,040 to Hammar, incorporated herein by reference.

Preferred monomers (B) include N-vinyl heterocyclic monomers and alkyl (meth)acrylamides. Most preferred are N,N-dimethyl acrylamide (DMA) and N-vinylpyrrolidone (NVP). A preferred mixture of two monomers (B) is DMA and EOEMA.

The polymerization reaction for the mixture of compounds (A) and (B) to prepare the pigment binder is carried out in an organic solvent medium utilizing conventional solution polymerization procedures that are well known in the art. While it is preferable to polymerize (A) and (B) prior to placement upon the lens or mold, one of skill in the art will recognize that such polymerization can occur after placement of the constituents on the mold, for example. Preferably the polymerization is carried out in the presence of a polymerization initiator.

Suitable polymerization initiators include radical polymerization initiators and photo polymerization initiators. Of course, the initiator chosen will depend upon the type of polymerization carried out. Typical examples of radical polymerization initiators include azobisisobutyronitrile (AIBN), azobis-dimethylvaleronitrile, benzoyl peroxide, t-butyl hydroperoxide, and cumene peroxide. Such curing compositions include those available commercially from CIBA Specialty Chemicals under the "IRGACURE" trade name and from DuPont under the "VAZO" tradename, such as VAZO 64 (AIBN), VAZO 67 (butane nitrile, 2-methyl, 2,2'-azobis) and VAZO 88 (cyclohexane carbonitrile, 1,1'-azobis).

Typical examples photo polymerization initiators include, a benzoin photo polymerization initiator such as methyl orthobenzoylbenzoate, methyl benzoylformate, benzoin methyl ether, benzoin ethyl ether, benzoin isopropyl ether, benzoin isobutyl ether or benzoin n-butyl ether; a phenone photo polymerization initiator such as 2-hydroxy-2-methyl-1-phenylpropane-1-one, p-isopropyl-α-hydroxyisobutylphenone, p-t-butyltrichloroacetophenone, 2,2-dimethoxy-2-phenylacetophenone, α,α-dichloro-4-phenoxyaceto-phenone or N, N-tetraethyl-4,4-diaminobenzophenone; 1-hydroxycyclohexyl phenyl ketone; 1-phenyl-1,2-propanedione-2-(o-ethoxycar a thioxanthone photo polymerization initiator such as 2-chlorothioxanthone or 2-methylthioxanthone; dibenzosvarron; 2-ethylanthraquinone; benzophenone acrylate; benzophenone; and benzil.

The identity of the polymerization initiator is not critical and is not part of the present invention. One of ordinary skill in the art will readily recognize the kind and amount of photoinitiator that will yield good results in the present invention. The initiator presently preferred by the inventors is VAZO 52, a thermal initiator similar to VAZO 64.

Organic solvents which may be used in the polymerization of the compounds (A) and (B) include virtually any of the organic solvents known to be employed in preparing conventional acrylic or vinyl polymers, such as, for example, alcohols, ketones, aromatic hydrocarbons, or mixtures thereof. The solvent or solvents employed is or are generally selected based on compatibility with the other components of the binder and like considerations. Illustrative of solvents employed alone or admixture in the compositions of the invention are ketones such as methylethylketone, methylisopropylketone, diethylketone, cyclopenta-none, cyclohexanone and the like; chlorinated hydrocarbons such as trichloroethylene, 1,1,1-trichloroethane and the like; aliphatic alcohols such as ethanol, n-propyl alcohol, n-butyl alcohol, n-hexyl alcohol and the like; aliphatic esters such as n-butyl acetate, n-hexyl acetate, cellosolve acetate, ethyl lactate and the like; glycol ethers such as ethylene glycol monomethyl ether, propylene glycol monomethyl ether and esters thereof such as the acetates, propionates and the like; and aromatic hydrocarbons such as toluene, xylene and the like; and aromatic ethers such as anisole.

However, some of the disadvantages mentioned above concerning diluents in contact lens monomer mixtures may also apply to the solvent system chosen. Therefore, it may be important to choose a solvent that does not react with (or reacts very slowly) with the pigment binder. Any non-nucleophilic organic solvent in which the reactants are soluble and having a boiling point at or above the desired reaction temperature may be used. An inert solvent is one that does not react with either of the starting materials under the reaction conditions employed. Among the inert solvents that are suitable are liquid halogenated lower alkanes (e.g., methylene chloride, chloroform, 1,2-dichloroethane, 1,2-dibromoethane, 1,1,1-trichloroethane and 1-bromo-2-chloroethane) and ketones. In this respect, the most preferred solvent is cyclohexanone. The solvent employed should also be compatible with the colorants and non-destructive toward contact lens materials.

In the preferred embodiment of the present invention, the color coat (or ink as it can be referred to prior to application) is stable for at least four hours. More preferably, the ink is stable for at least eight hours. Even more preferably, the ink is stable for at least two days. Most preferably, the ink is stable for at least one week, or for at least three weeks. By "stable" with reference to ink, it is meant that no significant increase in viscosity occurs over a specific time period. A stable ink provides more flexibility in the mass production of colored ophthalmic lenses. The increase in viscosity (also referred to as gelling) is typically caused by crosslinking reactions between the components of the color coat. Accordingly, the color coat is preferably substantially free of compounds that crosslink with the binder polymer.

Lenses colored by this invention can be formed from any known polymerizable hydrophilic or hydrophobic material suitable for ophthalmic uses. Lens forming materials that are suitable in the fabrication of contact lenses are illustrated by numerous issued US patents and familiar to those skilled in the art.

Preferred polymers for making the lens include those having the functional groups —COOH, —OH, and/or —NH—R, where R is hydrogen or alkyl. Polymers having amine functional groups would be more reactive, and thus, would result in a faster curing color coating once it is applied to the lens. Preferred materials are hydrophilic and absorb substantial amounts of water to form hydrogels. Preferred hydrophilic polymers containing functional groups are formed from e.g., acrylic acid, methacrylic acid, hydroxy $C_1$ to $C_6$ alkyl esters of acrylic and methacrylic acid (e.g., hydroxyethyl methacrylate and hydroxybutyl acrylate), amino $C_1$ to $C_8$ alkyl esters of acrylic and methacrylic acid (e.g., amino ethyl acrylate or N-ethyl amino methyl methacrylate), glycerol esters of acrylic and methacrylic acid, and mixtures thereof. Exemplary hydrophilic lenses having the functional groups are disclosed in U.S. Pat. No. 4,405,773, (Loshaek) and are formed from a mixture of hydroxyethyl methacrylate, ethoxyethyl methacrylate, and methacrylic acid.

Producing the lens by polymerization, crosslinking, and/or shaping is well known in the art and is not presently considered a critical part of this invention. Any of the well-known techniques of cast molding and spin casting may be employed.

When compounds (A) and (B) are incorporated into a binder polymer, they will enable the binder polymer to crosslink in the presence of a reagent such as water. They are also reactive with other materials such those containing the functional groups —OH, —$NH_2$, and NHR, where R is alkyl. The crosslinking could be done during the lens hydration and/or sterilization step. This aspect has the advantage that a separate adhesion promoter species is not needed and crosslinking could be accomplished in the lens sterilization step, the lens hydration step, or during a separate cure step. Monomers and an initiator may be, but do not need to be (and are preferably not), added to the ink.

The viscosity of the binder polymer as it applied to the lens material is important for maintaining print quality. The viscosity of an ink solution can be as high as about 5,000 centipoise, but is preferably between about 1 to about 1000 centipoise. The optimal viscosity of the color coat is determined largely by the method by which the coat is applied to the lens. For example, if the color coat is to be applied by ink jet printing, the viscosity of the ink should be less than 50 centipoise, preferably less than 30 centipoise, and most preferably equal to or less than 15 centipoise. On the other hand, if the ink is to be applied by pad printing, the viscosity is preferably above 100 centipoise; more preferably above 200 centipoise.

Solutions having low viscosity tend to be "runny" when dispensed, and can allow different colors to merge and blend, resulting in an image with a more natural appearance. Such blending can be enhanced using a variety of methods, including sonication or vibration at appropriate duration and frequency to promote appropriate blending. Solutions having too low a viscosity can result in images that are too "runny" and thus have potentially, undesirable characteristics, such as pooling of ink in a pattern or spreading of ink to an unintended location. The skilled artisan will recognize that the size of the ink droplet as applied to the lens and the surface tension thereof will also influence the behavior of the ink when printed on a lens or a mold. Thus, depending on these factors, the viscosity of the ink may vary from the numbers given above and still function within the scope of this invention.

Solutions having too high a viscosity may not be easily dispensed using a variety of printing structures, such as inkjets and thus may not be appropriate for the present invention. Furthermore, solutions having high viscosity can tend to "bead" on a surface and not blend with the surrounding environment, including surrounding droplets or beads of ink. Under these circumstances, the ink may form unnatural appearing images.

Agents such as thickeners or appropriate solvents can be used to adjust the viscosity of the color coating composition. Such agents are preferably non-nucleophilic in nature.

The lenses may be prepared with or without an optical prescription for correcting visual defects. The lenses may contain an opaque color coat which can bring about a fundamental color change in the apparent color of the wearer's iris, for example from dark brown to light blue. Alternatively, the color coat may be transparent, in which case the apparent eye tint may be enhanced, or the apparent color of light-colored eyes may be changed. "Enhancing lenses," allow the natural iris to show through but combine with that natural color to produce a new appearance. Such enhancing lenses might typically be used to turn a hazel eye to an aqua colored eye. However, this class of colored lenses may not be able to change an underlying dark colored, brown iris to blue.

Not only is it possible to choose from entirely opaque or entirely transparent color coats, but also it is preferable to color selected portions of the lens. Specifically, it is preferable to color the lens in a pattern that simulates the fine structure of the iris, preferably using more than one color. Alternatively, it is possible to deposit an opaque or semi-opaque pattern over the iris portion of the lens in a manner that can change the apparent color of the iris, as described in U.S. Pat. No. 5,414,477 to Jahnke. It is well recognized that the pattern of the color coat on or in the lens is a significant factor in the apparent cosmetic quality of the lens. The lenses are quite durable and retain their color upon prolonged use, even though subjected to the usual disinfecting and cleaning procedures. The colorant used in the color coat need not be reactive.

The color coat can be placed on lens in the dry state, a lens in a wet state, or on the mold by a variety of printing procedures. In fact, the color coat could be painted on the lens or mold with a brush. Obviously, in the commercial manufacture of the lens, it is more desirable to print the pattern onto the lens surface or the mold surface using well known and understood automated techniques, such as by pad-transfer printing from an etched plate of the pattern using a soft rubber pad, such as one made of polydimethylsiloxane rubber, and equivalent materials. The pattern may be created on the lens or on the mold with an airbrush, or by ink jetting, and the like methods of coating the colored film onto the mold. Alternatively, the color coat may be injected from a die having a face that conforms to the shape of the lens or mold surface and possessing holes in the face configuring to the iris section on the mold's surface. The holes replicate the pattern to be coated on the lens or mold. The die can be dropped to the surface of the lens or mold like a date stamper, and the pressure on the die face can be used to force the colored material out of the die onto the lens or mold.

In pad-transfer printing, an image is placed or printed on a pad transfer device and the image on tile pad transfer device is transferred to another surface, such as a polymer or lens (U.S. Pat. No. 3,536,386 to Spivack; U.S. Pat. Nos. 4,582,402 and 4,704,017 to Knapp; U.S. Pat. No. 5,034,166 to Rawlings et al.). For example, appropriate pad-transfer printing structures include, but are not limited to Tampo-type printing structures (Tampo vario 90/130), rubber stamps, thimbles, doctor's blade, direct printing, or transfer printing as they are known in the art.

When the color coat is applied to the lens mold, rather than to the lens itself, the color coat is applied to a surface of the mold and the mold is then charged with the lens forming monomer while maintaining the color coat in the iris portion and configuring the resin about the color coat. The lens monomer is then polymerized using any of the well-known polymerization techniques. Alternatively, if the lens forming composition is a polymer (such as poly(vinyl) alcohol) the composition is then cross-linked according to well-known techniques. In this manner the color coat becomes integral with the body of the lens when the molded lens is removed from the mold. The resulting lens is essentially smooth and continuous on the surface containing the color coat.

In the preferred embodiment, the color coating of the present invention has good transferability to a medical device. "Good transferability" in reference to a color coat means that a color image printed on a mold with the color coat will be transferred completely onto the medical device cured in that mold.

More than one printing structure or more than one printing method can be used to make an image with the method of the present invention. For example, ink-jet printing and pad transfer printing can be used in combination.

If the lens is intended to be natural in appearance, the color coat preferably contains voids. Typically the voids comprise about 5 to about 80% of the color coat's area. On the other hand, it is preferred that the color coat occupy from 50% to all of the area of the lens in the iris region thereof (or that portion of the mold corresponding to the iris region of the lens).

While, either the front or rear surface or both may be coated, it is preferable to apply the color coat to the front surface of the lens. However, there are special cosmetic effects achievable by providing a pattern on both the anterior and posterior surfaces. For instance, a colored pattern of one color can be applied to the back surface of the lens or the corresponding mold-half (for instance, white) and the same or different colored pattern can be applied to the front surface of the lens or the corresponding mold-half (for instance, dark blue). This then would result in a lens that could have either a multi-color textured appearance for extremely lifelike appearance, or a brighter tint using a white background to reflect back out at the observer.

If the color coat is applied to both sides of a lens by printing up both sides of the mold, a pattern is affixed to both the back surface and the front surface molds as afore-described. Part of the lens-forming monomer mixture is supplied to each of the mold halves and each is partially polymerized thus fixing the patterns to the front and back surfaces of the lens. The two mold halves are combined, and the combination is interpolymerized to complete the cure and the formation of the lens with the patterns on both surfaces The coated lens is then subjected to conditions that cure the color coat. If the colorant is opaque, then only the portion of the lens corresponding to the iris is usually coated, leaving the pupil section clear. For lenses that are larger in diameter than the iris, the portion of the lens extending beyond the iris may be left uncoated.

In any event, it is important that the resulting lens be ophthalmically compatible. Accordingly, while any suitable colorant may be employed, it is presently preferred that the colorant be a pigment that is heat resistant, non-toxic and insoluble in aqueous solutions. While not critical to the invention, the particle size of the pigments used in the present invention generally varies from about 0.02 microns to about 5 microns, with the preferred size of particle depending on the method of printing.

The choice of pigments is quite flexible, since they need not necessarily contain functional groups. The pigments may be any coloring substance or combination thereof that provides a desired color. Preferred pigments include (C.I. is the color index no.) for a blue color, phthalocyanine blue (pigment blue 15, C.I. 74160), cobalt blue (pigment blue 36, C.I. 77343); for a green color, phthalocyanine green (Pigment green 7, C.I. 74260) and chromium sesquioxide; for yellow, red, brown and black colors, various iron oxides; for violet, carbazole violet. Of course, since any color can be obtained by merely mixing two or more primary colors together, blends of such primary colors are used to achieve the desired shade. As defined herein, "primary colors" mean cyan, magenta, and yellow. Titanium dioxide can be added to the color coat to increase the opacity of the color coat.

In general, the amount of colorant added to the organic binder is of from about 10 to about 80% preferably from about 20% to about 50% by weight of the total pigment-binder composition. A white pigment-binder composition may contain of from about 40 to about 60% by weight of pigment based on the weight of the pigment-binder composition, while a black pigment-binder composition may contain of from about 30 to about 60% by weight of the pigment-binder composition. A red pigment-binder composition may contain of from about 33 to about 50% by weight of the pigment-binder composition. A blue pigment-binder composition may contain of from about 32 to about 50% by weight of the pigment-binder composition, while a yellow pigment-binder composition may contain of from about 33 to about 50% by weight of the pigment-binder composition.

The inks disclosed herein may contain dispersants. Dispersants are surface active agents added to promote the distribution and separation of fine particles, such as, for example, the Tergitol series from Union Carbide, polyoxylated alkyl ethers, alkyl diamino quartemary salts, surfynol, Pluronic, Pluronic R, or PECEGAL "0" from GAF (U.S. Pat. No. 5,560,766).

Dispersants are preferably not used if the method of printing is pad printing. However, when the method of printing is ink jet printing, a dispersant or other surfactant is preferably employed. If present, are preferably used at between about 0.1% and about 10%, more preferably between about 0.5% and about 5%. However, because of the presence of active hydrogens in various surfactants, the surfactant may cause premature gelling. Thus, it is preferable to use surfactants in which the hydroxyl groups are either masked or protected. For example, it may be preferable to use polyethylene glycol surfactants in ether-terminated form. Furthermore, surfactants terminated in secondary hydroxyl groups (such as the PLURONIC R series) are preferable over those terminated in primary hydroxyl groups (such as the PLURONIC series).

Opaque coloring agents can be applied to a surface more than once to obtain the desired intensity, hue, or other color characteristic. Each application of the color coat can be printed in the same or different pattern, and can be printed in the same or different manner.

After coating, the lens is subjected to conditions that cause the color coat to adhere to the lens, thereby entrapping the colorant within the binding polymer in a manner that forms a colored contact lens. The coated lens, for example, may be subjected to UV radiation, heat, or moisture. The moisture can either be in the form of water vapor or liquid water. Of course, any conditions that crosslink the binder polymer and thus, bring about adhesion of the color coat, may be used.

The step of subjecting the lens to conditions that cure the binder may be combined with other steps in the lens manufacturing process. For example, if it is desired to cure the binder with heat, this could be done during the lens sterilization process when the lens is subjected to high temperatures. Alternatively, the binder can be water cured during the lens hydration step in which the lens is exposed to water for an extended amount of time. Thus, it is not necessary to have a separate step of curing the binder, thus simplifying the manufacturing process and reducing costs. However, when curing the color coat in a hydration step it is necessary to ensure that the color coat does not delaminate from the lens upon being placed into the water.

In some embodiments of the present invention, it may not even be necessary to expose the lens to such conditions, as the lens itself provides the necessary impetus for the binder to cure. For example, in the case of a water-curable binder, the very act of applying the color coat to a hydrated lens will begin the curing process. This is especially appropriate in the case of crosslinked polyvinyl alcohol lenses, which are formed in a hydrated state. (See, for example, U.S. Pat. No. 5,508,317). Likewise, if the color coat is applied to a lens comprising a polymer having functional groups as disclosed above, the binder will adhere to the lens without a distinct step of exposing the lens to moisture or heat. However, due to the rapid automated process typically used in present lens manufacturing processes, it may be desirable to speed the curing process, rather than wait the necessary time for un-aided curing.

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

EXAMPLE 1

A binder polymer was synthesized at 40° C. under nitrogen for 25 hours with the following formulation

| Component | Wt % |
| --- | --- |
| DMA | 57 |
| EOEMA | 37 |
| methacryloxypropyltrimethoxysilane | 5 |
| Vazo-52 | 0.54 |
| Toluene | 250 ml |

The viscosity of the resulting binder was 75 cps at 22° C.

EXAMPLE 2

An ink preparation was prepared by combining 10 g of the toluene polymer solution of Example 1 with 0.250 g of Permetjet Blue and stirred for 30 minutes. The viscous solution was filtered (2.7 micron filter) to remove unsolubilzed colorant.

EXAMPLE 3

Six Freshlook® lenses (phemfilcon) were tested for print adhesion under a variety of conditions. Excess water was removed from the lenses and a quantity of the ink formulation of Example 2 was placed on each lens with a syringe. As put forth in Table 1, the lenses were put through a combination of steps including a print cure step; an autoclave step; and a hydration step. The print cure step comprises subjecting the lens to a temperature of 85° C. for 45 minutes. The autoclave step comprises subjecting the lens to a temperature of 120° C. for 40 minutes. The lenses were hydrated for 45 minutes and put into packaging solution before being autoclaved.

The Print Adhesion test was performed by sonicating the lenses in methanol for 30 seconds, equilibrating for five minutes in saline buffer solution, and then rubbing the surface with a finger or a swab for approximately 10 seconds.

TABLE 1

| Lens | Hydrated | Print Cured | Autoclaved | Print Adhesion |
|------|----------|-------------|------------|----------------|
| A | N | Y | Y | F |
| B | N | Y | N | F |
| C | Y | N | N | F |
| D | Y | Y | N | P |
| E | Y | N | Y | P |
| F | Y | Y | Y | P |

EXAMPLE 4

A variety of inks were prepared by combing the binder of Example 1 with various pigments: Permajet Blue (1%); Iron Oxide Black (10%); and Phthalocyanine Blue (1%).

EXAMPLE 5

Nine hydrated Freshlook® lenses (phemfilcon) were tested for print adhesion under a variety of conditions. Excess water was removed from the lenses and a quantity of each ink formulation of Example 4 was placed on each lens with a syringe. As put forth in Table 2, the lenses were put through a combination of steps including a print cure step; an autoclave step; and a hydration step. The print cure step comprises subjecting the lens to a temperature of 85° C. for 45 minutes. The autoclave step comprises subjecting the lens to a temperature of 120° C. for 40 minutes. The lenses were hydrated for 45 minutes and put into packaging solution before being autoclaved.

TABLE 2

| Pigment | Print Cured | Autoclaved | Print Adhesion |
|---------|-------------|------------|----------------|
| Permajet Blue | Y | N | P |
| Permajet Blue | Y | Y | P |
| Permajet Blue | N | Y | P |
| Iron Oxide | Y | N | P |
| Iron Oxide | Y | Y | P |
| Iron Oxide | N | Y | F |
| Phthalocyanine Blue | Y | N | P |
| Phthalocyanine Blue | Y | Y | P |
| Phthalocyanine Blue | N | Y | F |

The non-print cured iron oxide and phthalocyanine lenses are indicated as a "fail" because the ink delaminated when the lenses were placed in the hydration solution prior to autoclaving.

EXAMPLE 6

The binder of Example 1 was precipitated with hexane and dried overnight in a vacuum at 40° C. To prepare inks with various solvents, 1 g of binder was dissolved in 10 ml solvent and 1% (by weight) of Permajet Blue was then added. Inks were prepared with toluene, cyclohexanone, cyclohexanone:methylethylketone (1:1); cyclohexanone:ethyl lactate (56:44); and cyclopentanone:ethyl lactate:HEMA (42.1:33.2:24.7). The formulation containing cyclohexanone:ethyl lactate gelled after one hour; the formulation containing cyclopentanone:ethyl lactate:HEMA gelled after three hours; and the formulation containing toluene gelled in 3 days. The siloxane groups on the binder polymer react with nucleophiles like hydroxyl groups. The gelling observed in the toluene formulation has been postulated to be an interaction with the permajet's phthalocyanine surface modification. The inks containing cyclohexanone did not gel, even after three weeks.

EXAMPLE 7

Nine hydrated Freshlook® lenses (phemfilcon) were tested for print adhesion under a variety of conditions. Excess water was removed from the lenses and a quantity of each ink formulation of Example 6 was placed on each lens with a syringe. As put forth in Table 3, the lenses were put through a combination of steps including a print cure step; an autoclave step; and a hydration step. The print cure step comprises subjecting the lens to a temperature of 85° C. for 45 minutes. The autoclave step comprises subjecting the lens to a temperature of 120° C. for 40 minutes. The lenses were hydrated for 45 minutes and put into packaging solution before being autoclaved.

TABLE 3

| Solvent | Print Cured | Autoclaved | Print Adhesion |
|---------|-------------|------------|----------------|
| Toluene | Y | N | P |
| Toluene | Y | Y | P |
| Toluene | N | Y | F |
| Cyclohexanone | Y | N | P |
| Cyclohexanone | Y | Y | P |
| Cyclohexanone | N | Y | F |
| CH:MEK (1:1) | Y | N | P |
| CH:MEK (1:1) | Y | Y | P |
| CH:MEK (1:1) | N | Y | F |

The non-print cured lenses are indicated as a "fail" because the ink delaminated when the lenses were placed in the hydration solution prior to autoclaving. A more rapid cross-linking reaction upon exposure to moisture would most likely prevent the delamination.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

We claim:

1. A method for making a colored polymeric substrate comprising the steps of:
   (a) providing a substrate constructed of a polymer;
   (b) coating at least a portion of a surface of the substrate with a color coat comprising at least one colorant, and a binder polymer obtained by copolymerizing polymerizable components comprising
      a. a first monomer being ethylenically unsaturated and having a latent crosslinkable pendent group selected from the group consisting of isocyanate, peroxy, perester, anhydride, alkoxysilane, silanol, acetoxysilane, silanes, halosilane, and combinations thereof; and
      b. a second monomer having an ethylenically unsaturated double bond copolymerizable with the first monomer;
      wherein the second monomer is substantially non-reactive with the latent crosslinkable group of the first monomer; and (c) subjecting the coated substrate to conditions which cause the color coat to adhere to the substrate.

2. A method as claimed in claim 1, wherein said latent crosslinkable pendent group is selected from the group consisting of isocyanate, peroxy, perester, anhydride, and combinations thereof.

3. A method as claimed in claim 1, wherein said latent crosslinkable pendent group is activated by moisture, heat, nucleophilic catalysis, or combinations thereof.

4. A method as claimed in claim 1, wherein said latent crosslinkable pendent group is selected from the group consisting of alkoxysilane, silanol, acetoxysilane, silanes, halosilane, and combinations thereof.

5. A method as claimed in claim 4, wherein said latent crosslinkable pendent group is selected from the group consisting of alkoxysilane and halosilane.

6. A method as claimed in claim 5, wherein said first monomer is a polymerizable halosilane or alkoxysilane compound of the formula (I):

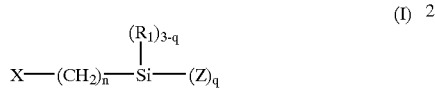
(I)

wherein X is a polymerizable group containing an unsaturated double bond; n is an integer from 0 to 12; Z is either a halide or —$OR_2$; each $R_1$ is, independently of any other, a halide, or a substituted or unsubstituted $C_{1-6}$ alkyl group; $R_2$ is, independently of any other, a substituted or unsubstituted $C_{1-6}$ alkyl group and q is an integer from 1 to 3.

7. A method as claimed in claim 6, wherein X is a (meth)acryloxy group, vinyl group, an allyl group, or a group of the formula

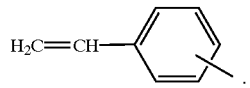

8. A method as claimed in claim 7, wherein X is a (meth)acryloxy group or a vinyl group.

9. A method as claimed in claim 6, wherein n is from 2 to 3, and X is a methacryloxy group.

10. A method as claimed in claim 6, wherein Z is —$OR_2$ and q is 3.

11. A method as claimed in claim 10, wherein at least one $R_2$ is a methyl group.

12. A method as claimed in claim 10, wherein Z is a halide.

13. A method as claimed in claim 6, wherein said first monomer is selected from the group consisting of methacryloxyethyltrimethoxysilane, methacryloxyethylmethyidimethoxysilane, methacryloxyethyldimethylmethoxysilane, methacryloxyethyltriethoxysilane, methacryloxyethylmethyldiethoxysilane, methacryloxyethyldimethylethoxysilane, methacryloxyethyltrichlorosilane, methacryloxypropyltrimethoxysilane, methacryloxypropylmethyldimethoxysilane, methacryloxypropyldimethylmethoxysilane, methacryloxypropyltriethoxysilane, methacryloxypropymethyidiethoxysilane, methacryloxypropyidimethylethoxysilane, styrylethyltrimethoxysilane, and 3-(N-styrlmethyl-2-aminoethylamino) propyltrimethoxysilane hydrochloride.

14. A method as claimed in claim 6, wherein at least one $R_2$ is a methyl group.

15. A method as claimed in claim 6, wherein said first monomer is selected from the group consisting of methacryloxyethyltrimethoxysilane, methacryloxyethylmethyldimethoxysilane, and methacryloxyethyidimethylethoxysilane.

16. A method as claimed in claim 6, wherein said first monomer is selected from the group consisting of methacryloxypropylmethyldichlorosilane, methacryloxypropyltrichlorosilane, 3-methacryloxypropyldimethylchlorosilane, and methacryloxyethyltrichlorosilane.

17. A method as claimed in claim 4, wherein said second monomer is silicon-free.

18. A method as claimed in claim 1, wherein the second monomer does not contain hydroxy functional groups, primary and secondary amine functional groups, or acid functional groups.

19. A method as claimed in claim 1, wherein the second monomer is selected from the group consisting of N-vinyl heterocyclic monomers, $C_1$ to $C_6$ alkyl vinyl ethers, $C_1$ to $C_6$ alkyl esters of acrylic or methacrylic acid, $C_1$ to $C_6$ alkyl styrenes, vinyl monomers, diene monomers, and $C_1$ to $C_6$ alkoxy $C_1$ to $C_6$ alkyl esters of acrylic or methacrylic acid.

20. A method as claimed in claim 19, wherein the second monomer is selected from the group consisting of N-vinyl heterocyclic monomers and alkyl (meth)acrylamides.

21. A method as claimed in claim 20, wherein the second monomer is selected from the group consisting of N,N-dimethyl acrylamide and N-vinylpyrolidone.

22. A method as claimed in claim 1, wherein said substrate is a contact lens and said step of subjecting the lens to conditions simultaneously causes the color coat to adhere to the lens and causes the lens to become hydrated.

23. A method as claimed in claim 1, wherein said substrate is a contact lens and said step of subjecting the lens to conditions simultaneously causes the color coat to adhere to the lens and causes the lens to become sterilized.

24. A method for making a colored contact lens comprising the steps of:
(a) providing a contact lens constructed of a polymer having functional groups;
(b) coating at least a portion of a surface of the lens with a color coat comprising at least one colorant, and a binder polymer obtained by copolymerizing polymerizable components comprising
  a. a first monomer being ethylenically unsaturated and having a latent crosslinkable pendent group selected from the group consisting of isocyanate, peroxy, perester, anhydride, alkoxysilane, silanol, acetoxysilane, silanes, halosilane, and combinations thereof; and
  b. a second monomer having an ethylenically unsaturated double bond copolymerizable with the first monomer;
wherein the second monomer is substantially non-reactive with the latent crosslinkable group of the first monomer; and
(c) allowing the color coat to crosslink, thus adhering to the lens.

25. A method for making a colored contact lens comprising the steps of:
(a) providing a contact lens constructed of a hydrogel polymer;
(b) coating at least a portion of a surface of the lens with a color coat comprising at least one colorant, and a binder polymer obtained by copolymerizing polymerizable components comprising a. a first monomer being ethylenically unsaturated and having a latent crosslinkable pendent group selected from the group consisting of isocyanate, peroxy, perester, anhydride, alkoxysilane, silanol, acetoxysilane, silanes, halosilane, and combinations thereof; and b. a second monomer having an ethylenically unsaturated double bond copolymerizable with the first monomer;

wherein the second monomer is substantially non-reactive with the latent crosslinkable group of the first monomer; and (c) allowing the color coat to crosslink, thus adhering to the lens.

26. A method of claim 25, wherein the second monomer does not contain hydroxy functional groups, primary and secondary amine functional groups, or acid functional groups.

27. A method of claim 25, wherein the second monomer has all of its active hydroxyl groups be pre-protected by a solvolyzable group to prevent their reaction with the latent crosslinkable groups.

* * * * *